United States Patent [19]
Benson

[11] Patent Number: 5,673,559
[45] Date of Patent: Oct. 7, 1997

[54] TURBINE HOUSING SYSTEM

[76] Inventor: Steven R. Benson, 5919 S. 350 West P.O. Box 57547, Murray, Utah 84157

[21] Appl. No.: 562,584
[22] Filed: Nov. 24, 1995
[51] Int. Cl.⁶ .................................................. F02B 37/18
[52] U.S. Cl. ............................................. 60/602; 415/144
[58] Field of Search ........................... 60/602; 415/144, 415/145

[56] References Cited

U.S. PATENT DOCUMENTS

| | | |
|---|---|---|
| D. 316,418 | 4/1991 | Benson . |
| 2,206,414 | 7/1940 | Markey . |
| 2,305,295 | 12/1942 | Lang et al. . |
| 2,774,618 | 12/1956 | Alderson . |
| 3,068,638 | 12/1962 | Birmann . |
| 3,218,029 | 11/1965 | Woollenweber, Jr. . |
| 3,673,798 | 7/1972 | Kuehl . |
| 4,294,073 | 10/1981 | Neff . |
| 4,304,097 | 12/1981 | Kondo et al. ............... 60/602 |
| 4,373,329 | 2/1983 | Martini . |
| 4,503,680 | 3/1985 | Wood . |
| 4,512,716 | 4/1985 | McHenry et al. . |
| 4,514,986 | 5/1985 | Benson . |
| 4,530,640 | 7/1985 | MacInnes ..................... 60/602 |
| 4,655,040 | 4/1987 | Parker ......................... 60/602 |
| 4,689,959 | 9/1987 | Houkita et al. ............... 60/602 |
| 4,850,797 | 7/1989 | Benson . |

FOREIGN PATENT DOCUMENTS

| | | |
|---|---|---|
| 3235538 | 3/1984 | Germany . |
| 3603498 | 8/1987 | Germany . |
| 57-137619 | 8/1982 | Japan ........................... 60/602 |
| 158334 | 2/1933 | Switzerland . |
| 2038940 | 7/1980 | United Kingdom ........ 60/602 |

*Primary Examiner*—Michael Koczo
*Attorney, Agent, or Firm*—M. Reid Russell

[57] ABSTRACT

A turbine housing system that includes a housing that is formed as a single casting and includes a pair of identical first and second scroll volute passages separated by a center wall that each provide a reducing cross section therealong through approximately three hundred sixty (360) degrees from an inlet end that connects to a source of engine inlet exhaust gas to an inlet throat of a turbine chamber wherein a turbine wheel is journaled to be turned by the entering inlet exhaust gas. An expansion chamber is provided to receive spent exhaust gas from the turbine chamber that is connected to a manifold to vent those spent gases to atmosphere. The housing further includes a turbine chamber bypass section that is open between one of the first or second passages and into the expansion chamber and includes a valve seat formed across the turbine chamber bypass section that is closed over by a valve head of a waste gate valve. The waste gate valve is mounted in the housing, such that a valve head thereof will lift off the valve seat should the pressure of the inlet exhaust gas exceed a maximum pressure, thereby opening the turbine chamber bypass section to pass inlet exhaust gas into the expansion section, so as to reduce the pressure differential across the turbine wheel, thereby reducing the speed of turbine wheel turning.

6 Claims, 4 Drawing Sheets

5,673,559

1

TURBINE HOUSING SYSTEM

BACKGROUND OF THE INVENTION

1. Field of the Invention

The invention relates to vehicle exhaust gas manifold systems and more particularly to a turbine housing formed as a single casting to pass an inlet exhaust gas flow to a turbine chamber wherein a turbine wheel is journaled and provides for exhausting spent exhaust from that turbine chamber.

2. Prior Art

The present invention constitutes an improvement in housings for containing a turbine chamber wherein a turbine wheel of a turbo charging unit is journaled to be turned by inlet exhaust gases that are passed from an engine manifold system of an internal combustion engine, and provides for venting spent exhaust gas from that turbine chamber. The housing provides for separating inlet exhaust gases, and unique to the invention, provides for connecting, through an internal passage, one of the inlet flows to the spent gas exhaust side of the turbine chamber. The flow of inlet exhaust gas through the internal passage of the invention is controlled by a waste gate valve that is positioned thereacross to open automatically when an inlet exhaust gas overpressure condition is present. Opening of the waste gate lowers the differential pressure across the turbine wheel, controlling the turbine wheel speed of turning within limits.

The housing of the invention includes separate inlet exhaust gas flow passages that curve identically through a scroll volute and exhaust into an inlet throat of a turbine chamber wherein a turbine wheel is journaled to be turned by that vehicle exhaust gas flow. The turbine wheel is part of a fresh air compressor, with the turning thereof providing for compressing a clean air flow that passes for mixing with fuel for burning in the engine. One of which separated passages opens into a gas transfer section of the housing and is arranged for passing inlet exhaust gases into the turbine chamber spent gas exhaust section bypassing the turbine chamber. A waste gate valve is maintained to the housing to open and close the gas transfer section, and is opened upon a sensing of an inlet overpressure, to pass a portion of the inlet exhaust gas flow into the spent gas exhaust side of the turbine chamber. This gas bypass flow provides for lowering a pressure differential across the turbine wheel so as to maintain that pressure differential within desired limits. The waste gate valve is arranged to operate on sensing that an overpressure condition exists in the inlet exhaust gas flow, and is opened to close off the gas transfer section, and pass a flow of inlet exhaust gas therethrough that lowers the pressure differential across the turbine wheel. Lowering the differential pressure, in turn, reduces the speed of turning of the turbine wheel, thereby controlling the pressure of the output fresh air flow from the compressor.

Heretofore, arrangements for transferring engine exhaust gases to an inlet side of a turbine housing scroll volute and to a turbine chamber therein have generally involved a housing connected to pipes that are bent to fit within the space or area available in an engine compartment and accordingly have ignored losses as are incurred through a creation of turbulence at sharp bends in the passages and flange type couplings of pipes that transfer the exhaust gas. Some examples of such arrangements are shown in U.S. Patents to Lang et al., U.S. Pat. No. 2,305,295; to Birmann, U.S. Pat. No. 3,068,638; to Kuehl, U.S. Pat. No. 3,673,798; to Martini, U.S. Pat. No. 4,373,329; and to Wood, U.S. Pat. No. 4,503,680, as well as a Swiss Patent, No. 158,334, and German Patent, No. DE 32 35 538 A1. None of which arrangements, however, involves a turbine manifold system housing capable of by-passing the turbine chamber like that of the invention.

The housing of the invention is separated, by a dividing wall into two passages, wherein the incoming vehicle exhaust gases pass, which passages each are shaped as identical scroll volutes and exhaust into the turbine chamber inlet throat. Such separated inlet passages are not shown in earlier housings, as for example, earlier housings of the present inventor, shown in U.S. Pat. Nos. 4,514,986, 4,850, 797, and Des. 316,418. The housings of these patents, as though they involve a housing system with smooth wall pipe sections that are formed and connected to a turbine housing to minimize losses within an exhaust gas stream, further do not provide for inclusion of a waste gate for controlling turbine operations, and allow the turbine manifold system to be used without damage over a wide range of engine operations and for a number of engines with differing operating capacities, as does the invention.

Examples of other turbine housing systems are shown in U.S. Patents to Woollenweber, Jr. U.S. Pat. No. 3,218,029, to Neff, U.S. Pat. No. 4,294,073 and to McHenry, et al., U.S. Pat. No. 4,512,716, none of which provide a housing with one of a pair of like interior passages to connect the inlet exhaust gas flow to the spent gas side of a turbine chamber with a waste gate valve for mounting into the housing that is operated to open and close the interior passage, to by-pass the turbine chamber providing for decreasing a pressure differential across the turbine chamber, as does the turbine housing system of the invention.

The turbine housing system of the present invention provides a combination of smooth interior surfaces that are formed and bent to provide for minimum losses in energy in an exhaust gas flow to a turbine chamber, and, for controlling the differential pressure across the turbine wheel to insure that the turbine wheel will not be turned above a certain speed, thereby controlling the pressure of a fresh air flow generated by the compressor.

SUMMARY OF THE INVENTION

It is, therefore, a principal object of the present invention to provide a turbine housing system that includes a housing having an internal wall to divide an inlet exhaust gas flow that is received from a vehicle exhaust gas manifold and for passing the flows, with minimum turbulence, to a turbine chamber inlet throat, and into the turbine chamber, for turning a turbine wheel journaled therein to generate a pressurized clean air flow for mixing with fuel, with that pressurized mix then injected into, for burning in, an internal combustion engine.

Another object of the present invention is to provide a turbine housing system that includes a housing that is cast as a single unit with an open interior section formed therein that connects a housing inlet exhaust gas passage to an outlet or spent gas side of the turbine chamber and providing for mounting a waste gate type valve to open that inlet exhaust gas passage upon sensing an overpressure condition across the turbine chamber, to vent a flow of inlet exhaust gas to the exhaust side of that turbine chamber for reducing the pressure differential thereacross for limiting the speed of turbine wheel turning limit to a pressurized clean air flow from the compressor and for controlling compressor response.

Another object of the present invention is to provide a turbine housing system of a turbine driven air compressor that is ported internally to provide a flow path for inlet exhaust gas to the exhaust or spent gas side of the turbine chamber and is formed to mount a waste gate valve in the housing, adjacent to that port, the valve to open, passing inlet exhaust gas around the turbine chamber, upon a sensing of a greater than desired pressure differential across the turbine wheel.

Still another object of the present invention is to provide a turbine housing system mounting a waste gate type valve that is operated to open and close a port end of an open interior section that is formed within the housing wherethrough inlet exhaust gas is passed to an outlet or spent gas side of the turbine chamber for limiting a differential pressure across a compressor turbine wheel, for use with a fresh air compressor system that is capable of utilization with a number of engines and to provide for a variety of turbine air compressor requirements.

Still another object of the present invention is to provide a turbine housing system of a turbine driven air compressor that is arranged for convenient and easy mounting within a space as is available in an engine compartment.

Still another object of the present invention is to provide a turbine housing that can be manufactured as a single unit or casting to have smooth interior walls that minimize friction losses in an exhaust gas flow therethrough.

In accordance with the above objects, the present invention is in a turbine housing system that includes a housing formed as a single unit, preferably as a casting, to have smooth, inner walls that curve to form a pair of scroll volutes separated by a center wall as exhaust gas inlet to an inlet throat turbine chamber that uniformly change direction through three hundred sixty (360) degrees and are acting against blades of a turbine wheel journaled therein. The volute smooth walls reduce in cross section therealong to provide for pressurizing a flow of vehicle exhaust gas flow therethrough. The housing includes a turbine chamber that accommodates the turbine wheel of a fresh air compression journaled therein, for turning by the inlet exhaust gas flow. The housing is arranged for mounting, at an inlet end, to a single or pair of vehicle exhaust manifolds, with the center wall providing for dividing the inlet exhaust flows that pass through the scroll volute for compression therein and passage through the inlet throat of the turbine chamber. One of the identical inlet sections is ported to open into an exducer bore as the exhaust or spent gas side of the turbine chamber. The exhaust side provides for a rapid volume change in the exhaust gas flow that results in a large pressure reduction in that flow. It is the pressure change from the inlet side of the turbine chamber to the exhaust side that is the pressure differential.

A waste gate valve is fitted into the housing and includes a head that is arranged to be moved over the internal port that functions as a valve seat. The waste gate valve head is moved onto and off of that seat during valve operation responsive to sensing of a greater than design differential pressure across the turbine wheel as could cause the turbine wheel to turn at a greater than design speed.

The turbine housing system is designed for fitting within the space available within a vehicle engine compartment for a particular engine or engines, and provides for maintaining a turbine wheel of an exhaust gas driven turbine air compressor that has been selected for the engine. The system of the invention provides a housing that, with the inclusion of a waste gate valve to vent inlet exhaust gas to the turbine chamber outlet side, provides for controlling a pressure differential across the turbine wheel during all engine operations. The turbine wheel is thereby prohibited from over-speeding as could damage the air compressor at even high engine power output, and further allows the system to be utilized on a number of engines of different power capabilities.

For mounting the housing in a vehicle exhaust system, the housing inlet preferably includes a mounting plate for coupling to an exhaust line from the vehicle exhaust manifold or manifolds. The housing also includes a plate for maintaining the waste gate valve thereto, and the turbine chamber discharge section includes a collar for mounting to an exhaust line.

THE DRAWINGS

The following drawings illustrate that which is presently regarded as the best mode for carrying out the invention:

Figure 1:
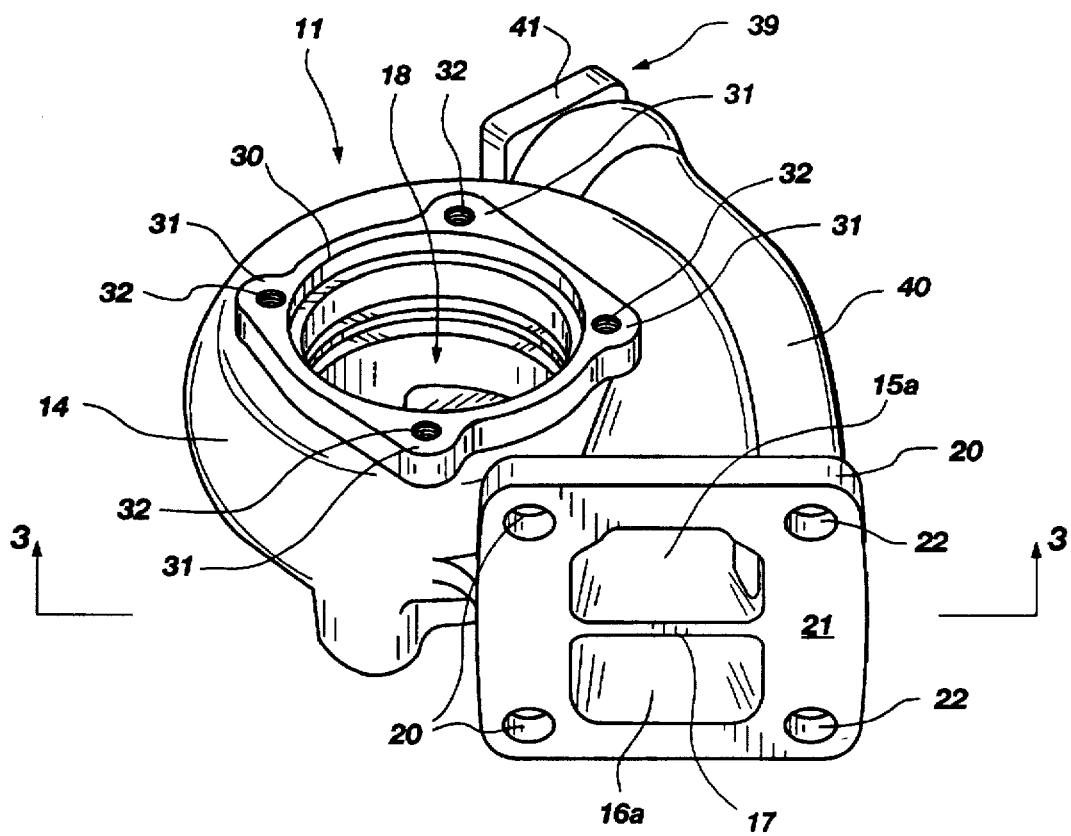
FIG. 1 shows a top plan perspective view taken from a manifold coupling end of a housing of a turbine housing system of the present invention.
Figure 2:
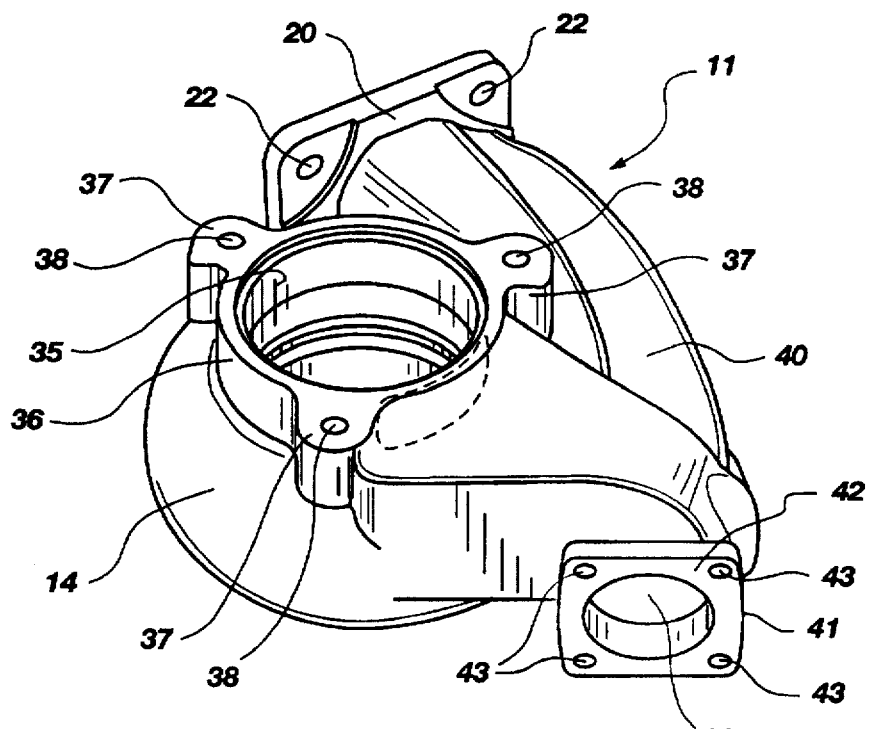
FIG. 2 shows a waste gate valve coupling end view of the housing of the turbine housing system of FIG. 1.
Figure 3:
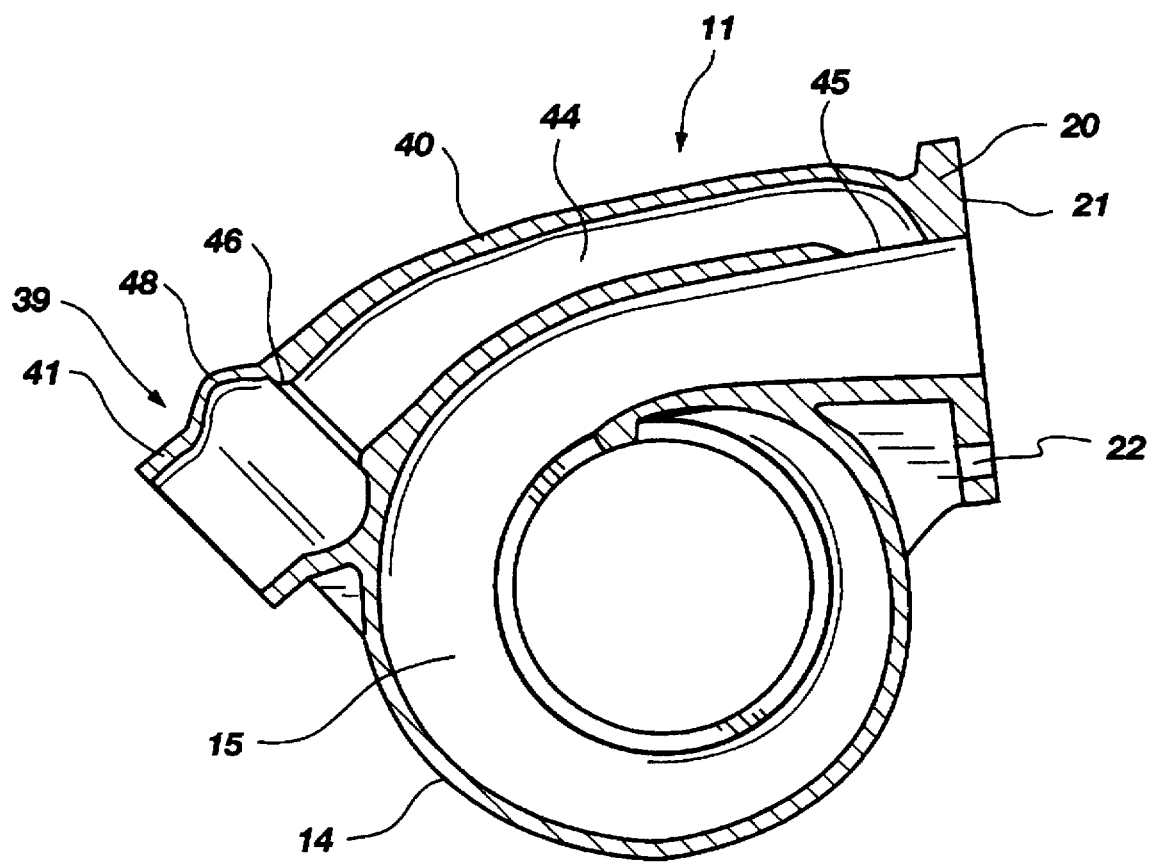
Figure 4:
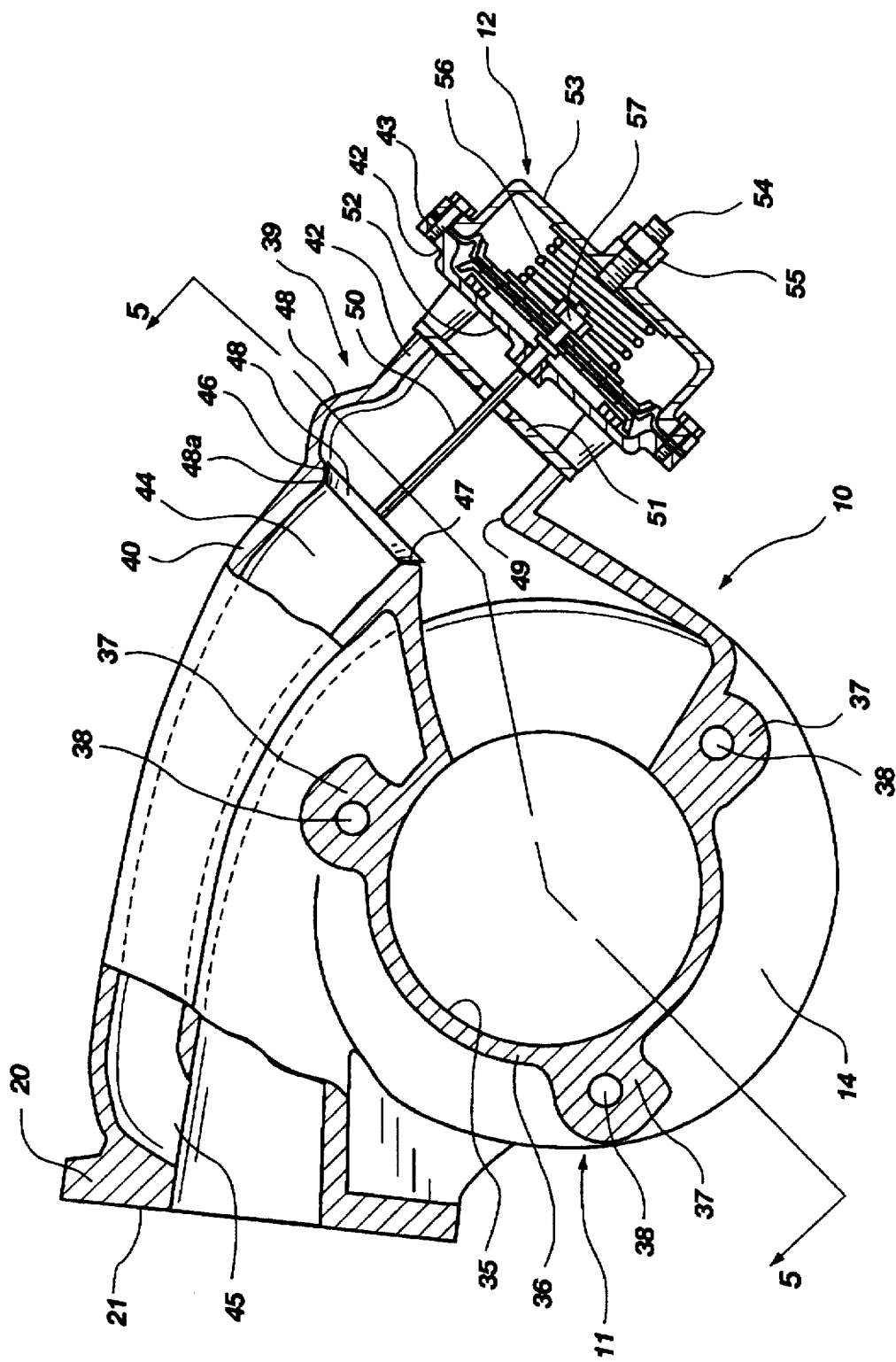
Figure 5:
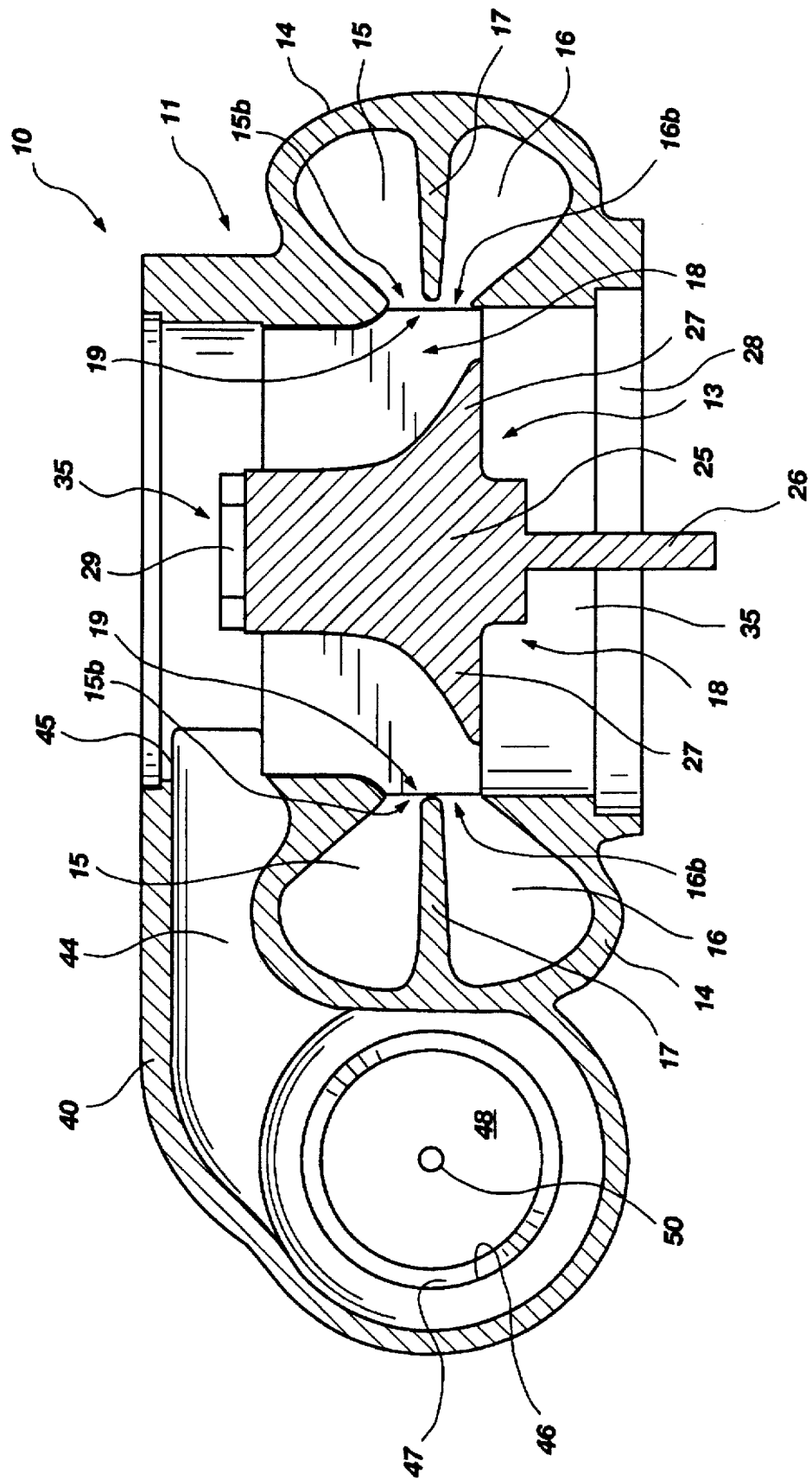

FIG. 3 shows a sectional view taken along the line 3—3 of FIG. 1 showing an exhaust gas inlet chamber and a waste gate coupling end of the housing of FIGS. 1 and 2 that is aligned with an internal cavity that has been formed into one of the pair of exhaust gas inlet passages and provides direct between the exhaust gas inlet throat of a housing turbine chamber and the turbine chamber expansion section;

FIG. 4 shows a bottom plan view of the turbine housing system of FIG. 1, showing sections removed from the housing to expose the waste gate port of FIG. 3 and cavity into a turbine housing expansion section and showing a waste gate valve mounted to the housing waste gate coupling with a disk shaped valve head shown mounted onto an end of a stem thereof that is shown fitted over the internal port of FIG. 3, with the port functioning as the valve seat; and FIG. 5 is a side elevation sectional view taken along the line 5—5 of FIG. 4 opening the housing center to show a turbine wheel journaled in the turbine chamber and showing the waste gate port, the separated exhaust gas inlet scroll volutes, and turbine chamber expansion section of the housing.

DETAILED DESCRIPTION

FIG. 1 shows a housing 11 of a turbine housing system 10 of the invention that, as shown in FIGS. 4 and 5, respectively, includes a waste gate valve 12 and mounts a turbine wheel assembly 13 having a turbine wheel 25 journaled in a turbine chamber 18 of the housing 11. The housing 11, as shown in the drawings, includes a scroll volute 14 that includes a pair of top and bottom inlet passages 15 and 16, that are identical, each providing a like reduction in cross section from an inlet end to a inlet throat of turbine chamber 18, the volute passages each turning through approximately three hundred sixty (360) degrees. The inlet passages 15 and 16 broad inlet ends 15a and 16a are open to receiving engine exhaust gas and are separated along their lengths by dividing wall 17, shown best in FIGS. 1 and 5. The passages 15 and 16 are identically reduced in cross section therealong for increasing the pressure of the inlet gas flow traveling to the inlet throat of the turbine chamber 18. The passages 15 and 16, as shown in FIG. 3, both slope inwardly and uniformly narrow in cross sectional area as they curve through approximately three hundred sixty (360) degrees between their inlet ends 15a and 16a, to exhaust ends 15b and 16b, shown in FIG. 5 that are at the inlet throat 19 of the turbine chamber 18, shown in FIG. 5.

A connecting plate 20, that is formed to have a square shape with a flat coupling surface 21, is secured across passages 15 and 16 inlet ends 15a and 16a and includes connector holes 22 formed through the corners of the connecting plate 20. The connecting plate 20 is for mounting, utilizing fasteners such as bolts, not shown, to a vehicle exhaust gas transfer line or manifold, not shown, to pass engine exhaust gases therethrough from either a single or a pair of engine exhaust manifolds. The engine exhaust gas is for turning a turbine wheel 25, shown in FIG. 5, that is journaled to turn in the turbine chamber 18. The turbine wheel 25 includes a shaft 26 connected for turning a fresh air compressor wheel of an air compressor, not shown, to pressurize a flow of fresh air for mixing with fuel for passage for burning in the engine. The pressurized fresh air generated by a compressor, not shown, turned by shaft 26 and fuel mix provide enhanced engine performance and faster engine reaction time.

For maintaining the turbine wheel 25 journaled in the turbine chamber 18 a plate 28 is arranged to fit across the chamber bottom end, as shown in FIG. 5, with a top end of the turbine wheel 25 journaled by connector 29 to turn freely. For maintaining the plate 28 across the bottom of the turbine chamber, as shown best in FIG. 1, a mounting flange 30 is secured thereto that has a flat surface thereacross and includes outwardly extending tabs 31 that are formed at spaced intervals therearound, connects holes 32 are formed through tab 31 for receiving fasteners, not shown, fitted therethrough and through holes in the plate 28, not shown. The plate 28 is maintained, in covering arrangement, over the turbine bottom, as shown in FIG. 5.

As set out above, the inlet exhaust gas flow passes through the scroll volute passages 15 and 16 that are separated by wall 17 to exhaust into the inlet throat 19 and into expansion section 35. The inlet exhaust gas flow enters the turbine chamber 18 through each inlet 19, at a right angle, to strike blades 27 of the turbine wheel 25 turning the turbine wheel. Whereafter, the spent exhaust gases are vented from the top of the turbine wheel into an expansion section 35 that, in practice, has a horizontal cross section taken across a mid portion of expansion section 35 that is approximately four (4) times greater than a vertical the cross section of the inlet throat 19 taken at the exhaust ends 15b and 16b of passages 15 and 16. The expansion section 35 is connected to pass spent gases therefrom to an exhaust manifold. As shown in FIG. 2, to mount such an exhaust manifold or tube, not shown, to receive the spent exhaust gases, the housing 14 is provided with a mounting collar 36 that is formed around the top of the expansion chamber 35 and includes spaced tabs 37 that extend outwardly therefrom that have connector holes 38 formed therethrough. The connector holes 38 to receive connectors, as for example bolts, not shown, for mounting to an exhaust manifold, tube, or the like, not shown, thereto.

In operation, the turbine wheel 25 speed of turning and resulting generation of a pressurized fresh air flow output from the compressor, not shown, is governed by the volume of the inlet exhaust gas available at the turbine chamber inlet throat 19 and the pressure drop across the turbine wheel 25 to the expansion section 35, which pressure drop is the pressure differential across the turbine wheel assembly 13. The volume of exhaust gases produced by an internal combustion engine is, of course, dependent upon the size of and the power generated by that engine in producing work, which exhaust gases are a direct output of that engine operation. Accordingly, to provide a desired fresh air pressurization for entrainment with fuel, also referred to as turbo charging, and passage of that fuel air mixture, for burning in the engine, it is necessary to carefully engineer the air compressor turbine to avoid an over pressurization and possible system damage in actual operation. Heretofore, additional to an engineering of an air compressor for a particular engine, a waste and external connecting line gate arrangement has sometimes been provided to exhausting surplus inlet exhaust gas prior to its reaching the turbine chamber, or an arrangement has been provided for venting a portion of the pressurized clean air prior to its mixing with fuel. Such waste gate and venting arrangements, unlike the present invention, have not been formed as an internal passage with the housing and connected to open and close that internal passage arranged to pass inlet exhaust gases around the turbine wheel 25 controlling the pressure differential thereacross turbine housing system like that of the invention.

The housing 11, as shown in the Figs., includes an internal turbine chamber bypass tubular section 40, hereinafter referred to as tubular section 40, that has a passage 44 therethrough and includes a mounting collar 41 maintained across an end thereof identified as a waste gate end 39 thereof. The mounting collar 41 has a square cross section, with a flat outer face 42 and includes connector holes 43 formed through the collar corners. The mounting collar 41 is to receive waste gate 12 mounted thereto, as shown in FIG. 4. So arranged, an interior end 45 of the tubular section 40 opens into one of the inlet exhaust gas passages 15 or 16, shown herein as passage 15, with the opposite or forward end of passage tubular section 40 formed into a round port that functions as and will hereinafter be referred to as seat 46 shown best in FIG. 4 and also as a broken line representation in FIG. 5. As shown, the seat 46 edge slopes at 47 inwardly from outer to inner surfaces, sloping away from the waste gate end 39 mounting collar 41. Seat 46 along edge 47 provides a surface for receiving an outer edge of a flat round disk 48 of the waste gate valve 12 that is to fit and seal therein, as shown in FIG. 4. The passage 44 of the tubular section 40, adjacent to the mounting collar 41, is outwardly bowed at 48b and, across from that bow, is open at 49 into the expansion section 35 arranged above the turbine chamber 18. With the waste gate valve disk 48 lifted off of seat 46, inlet exhaust gases will pass from passage 15, through the tubular section 40, through the seat 46 and opening 49 and into an area of the expansion section 35 that exhaust gases from the turbine chamber 18 travel into. Such by-pass of a portion of the inlet exhaust gas flow into the expansion section 35 both reduces the flow across the turbine wheel, and provides a reduction in differential pressure. Such differential pressure between the inlet throat 19 and expansion section 35 reduces the speed of turning of the turbine wheel 13 lowering the volume and pressure of the fresh air output flowing out from the compressor to prevent a turbine wheel 25 overspeed condition.

The turbine housing system 10 of the invention provides, in a single housing 11, for coupling to a manifold or manifolds that deliver vehicle exhaust gas thereto. The inlet exhaust flow is divided by a central wall 17 into separate scroll volute passages 15 and 16 that deliver the exhaust gas to the inlet throat of turbine chamber 18. The turbine wheel 25 of the turbine wheel assembly 13 is journaled in the turbine chamber 18 to be turned by that exhaust gas flow that enters the chamber through the inlet throat 19, striking blades 27 each of the turbine wheel 25, in turn, at a right angle. Kinetic energy in the inlet exhaust gas provides for turning the turbine wheel 25, with the spent exhaust gas then directed out from the turbine wheel into the expansion chamber 35. As set out above, the passages 15 and 16, turbine chamber 18 and expansion chamber 35 are all formed within the single housing 11 that is preferably a single casting and includes the open interior section 40. The open interior section 40 provides an opening 44 therethrough to vent, when the port at seat 46 is open, inlet exhaust gas from one of the passages 15 or 16 into the expansion chamber 35, reducing the differential pressure across the turbine wheel 25, on operation of the waste gate valve 12. To accommodate waste gate valve 12, a waste gate mounting 41 is provided that opens into the housing 11. The waste gate valve 12 includes a movable flat round disk 48 that is for fitting into seat 46 closing off flow. A waste gate valve 12, as shown in FIG. 4, that may be used as a component of the housing system 10 of the invention, includes a straight shaft 50 that has the disk 48 mounted across an outer end. A shaft 50 inner end is shown fitted closely in to slide through a hole in a guide plate 51 that limits side to side movement of shaft 50 that passes through a cavity between inner and outer spring housing plates 52 and 53. The shaft inner end extends through the outer spring housing plate 53 and receives a nut 55 turned over a threaded shaft 50 end 54. A coil spring 56 is maintained in the area between the spring housing plates 52 and 53 wherethrough the straight shaft 50 is fitted. The straight shaft 50 is, in turn, secured at 57 to a lower coil of which coil spring 56.

The coil spring 56 is shown compressed when the disk 48 is fitted into the seat 46 with the disk edge 48a fitting tightly and essentially sealing against the seat sloping surface 47. The compressed coil spring 56 biases the disk 48 into sealing engagement across the seat 46, prohibiting the inlet flow of exhaust gas from passing through section 44 into the turbine chamber 18 expansion section 35. However, should the pressure of the inlet exhaust gas reach a pressure that is greater than the biasing force exerted by the coil spring 56, as when a greater than desired pressure of inlet exhaust gas flow is passed into the housing 11, the disk 48 will be pushed off of the seat 46. The inlet exhaust gases traveling into passage 15 are thereby allowed to pass through exhaust end 15b into the expansion section 35 striking blades 27 of the turbine wheel 25 that is turning in the turbine chamber 18. This inlet gas flow reduces the volume of the flow directed against blades 27 and lowers the differential pressure across the turbine wheel 25 thereby reducing the speed of turbine wheel turning without disturbing the gas flow therethrough. So arranged, the waste gate valve 12 automatically compensates for the presence of a greater than desired inlet exhaust gas pressure by reducing the speed of turbine wheel turning, avoiding damage to the compressor and/or producing a higher than required output flow of compressed fresh air to the fuel injection system.

While a preferred structure for waste gate valve 12 is shown in FIG. 4 and described herein, it should be understood that the invention in a turbine housing system is not limited to any particular waste gate valve and that other waste gate valves, such as, for example, one that is solenoid operated on command by an engine computer sensing a greater than design differential pressure, or a turbine wheel 25 speed of turning approaching or greater than design, or like condition, could be so used within the scope of this disclosure.

A utilization of the turbine housing system 10 that includes housing 11 that provides for mounting a waste gate valve 12, or the like, allows the system of the invention to be installed with a number of internal combustion engines of different horse power ratings to operate efficiently and effectively and without system damage over a wide range of engine power settings.

Hereinabove has been set out a description of a preferred embodiment of the turbine housing system of the present invention. From the above discussion it should be obvious that the housing 11 can be configured for inclusion with different arrangements of waste gate valves 12 within the scope of this disclosure. Further, it should be understood, the present invention is in a single housing 11 that is preferably formed as a casting to include separate inlet exhaust gas passages with each feeding into a turbine chamber that vents, through an expansion chamber to an engine exhaust. The housing 11 provides an internal section that opens from one of the passages into the expansion chamber and includes a port or seat formed therein that can be opened or closed by operation of the waste gate valve for venting inlet exhaust gas to an outlet side of the turbine chamber to lower a differential pressure across turbine wheel 25 that is turning in the turbine chamber 18. Accordingly, while a preferred embodiment of housing 11 has been shown and described herein, it should be understood that the present invention can be varied within the scope of this disclosure without departing from the subject matter coming within the scope of the following claims, and a reasonable equivalency thereof, which claims I regard as my invention.

I claim:

1. A turbine housing system comprising, a housing that is formed as a single unit having a pair of like first and second inlet exhaust gas passages that are separated by a wall that extends from an inlet passage end to an inlet throat of a turbine chamber, where each said passage is formed as a scroll volute that reduces uniformly in cross section therealong through a curve to said inlet throat, a turbine chamber that is open at said inlet throat and is arranged for maintaining a turbine wheel journaled therein, and including an expansion section formed in said housing for receiving a discharge from said turbine chamber, and said housing further including a turbine chamber bypass section formed to have an open passage between only one of said first or second inlet exhaust gas passages and said expansion section; means for mounting said inlet exhaust gas passages to an end coupling of a pipe wherethrough engine exhaust gas flow travels and means for connecting said expansion section to a manifold for passing spent engine exhaust gases thereto; and means for mounting a waste gate valve means into said housing that is operated to pass an engine exhaust gas flow through said bypass section.

2. A turbine housing system as recited in claim 1, wherein the housing is formed as a single casting and includes a flange coupling as the means for mounting said first and second inlet exhaust gas passages, that are essentially identical scroll volutes, to a manifold or pipe end wherethrough is passed the engine exhaust gas flow; a flange coupling as the means for connecting the expansion section to a manifold for passing spent exhaust gases; and a flange coupling as the means for mounting the waste gate valve means across the opening into said housing.

3. A turbine housing system as recited in claim 1, wherein the turbine chamber bypass section includes a port that opens into the expansion section, which said port is arranged as a valve seat to receive the waste gate valve head means to seal thereto and means for moving said valve head means off said valve seat.

4. A turbine housing system as recited in claim 3, wherein the part is formed as a round hole and is the valve seat and includes an edge that slopes away from the valve head means; and the valve head means is a round disk that has an outer edge that is shaped to fit closely in said valve seat and is axially mounted to the end of a straight shaft that extends from a body of the waste gate; and means for urging said valve head into said valve seat, against the pressure of the inlet exhaust gas flow in the passage.

5. A turbine housing system as recited in claim 1, wherein, at a mid portion, the expansion section has a horizontal cross section that is approximately four (4) greater than a vertical cross section at the inlet throat.

6. A turbine housing system as recited in claim 1, wherein the housing first and second inlet exhaust gas passages, turbine chamber and bypass section walls are smooth walled.

* * * * *